United States Patent
Ajanovic et al.

(10) Patent No.: US 6,272,563 B1
(45) Date of Patent: Aug. 7, 2001

(54) METHOD AND APPARATUS FOR COMMUNICATING ROUTING AND ATTRIBUTE INFORMATION FOR A TRANSACTION BETWEEN HUBS IN A COMPUTER SYSTEM

(75) Inventors: Jasmin Ajanovic, Folsom; David J. Harriman, Sacramento, both of CA (US); C. Brendan S. Traw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/186,210
(22) Filed: Nov. 3, 1998
(51) Int. Cl.[7] .................................................. G06F 13/14
(52) U.S. Cl. .......................... 710/29; 709/228; 709/245
(58) Field of Search ............................... 710/29; 709/228, 709/245

(56) References Cited

U.S. PATENT DOCUMENTS

| | | |
|---|---|---|
| 4,413,318 * | 11/1983 | Herrington ............................ 709/100 |
| 4,875,206 | 10/1989 | Nichols et al. . |
| 5,309,433 | 5/1994 | Cidon et al. ............................ 370/60 |
| 5,337,313 | 8/1994 | Buchholz et al. . |
| 5,483,522 * | 1/1996 | Derby et al. ............................ 370/54 |
| 5,488,694 | 1/1996 | McKee et al. ......................... 395/824 |
| 5,535,208 | 7/1996 | Kawakami et al. ..................... 370/84 |
| 5,550,816 | 8/1996 | Hardwick et al. . |
| 5,608,662 | 3/1997 | Large et al. . |
| 5,613,069 | 3/1997 | Walker ............................ 395/200.15 |
| 5,615,404 | 3/1997 | Knoll et al. ........................... 395/882 |
| 5,621,734 * | 4/1997 | Mann et al. ........................... 709/227 |
| 5,621,898 | 4/1997 | Wooten ................................. 395/297 |
| 5,621,900 | 4/1997 | Lane et al. ............................ 395/300 |
| 5,632,016 | 5/1997 | Hoch et al. ....................... 395/200.02 |
| 5,634,015 | 5/1997 | Chang et al. .......................... 395/309 |
| 5,640,599 | 6/1997 | Roskowski et al. .................. 395/849 |
| 5,752,076 | 5/1998 | Munson ................................ 395/825 |
| 5,802,048 | 9/1998 | Duckwall ............................. 370/389 |
| 5,845,091 | 12/1998 | Dunne et al. . |
| 5,848,297 | 12/1998 | Krein et al. .......................... 395/876 |
| 5,890,015 | 3/1999 | Garney et al. ........................ 395/882 |
| 5,909,556 | 6/1999 | Morriss et al. ....................... 395/280 |
| 5,914,953 | 6/1999 | Krause et al. ........................ 370/392 |
| 5,915,104 | 6/1999 | Miller .................................... 395/309 |
| 5,933,611 | 8/1999 | Shakkarwar ......................... 395/306 |
| 5,978,854 * | 11/1999 | Fujimori et al. ...................... 709/245 |

* cited by examiner

Primary Examiner—Thomas Lee
Assistant Examiner—Abdelmoniem Elamin
(74) Attorney, Agent, or Firm—Calvin E. Wells (57) ABSTRACT

One embodiment of an apparatus for communicating routing and attribute information for a transaction between hubs in a computer system is disclosed. The apparatus includes a data path input/output unit to output a packet header for a transaction. The packet header includes a transaction descriptor routing field to identify an initiating agent that initiated the transaction. The transaction descriptor routing field includes a hub identification portion and a pipe identification portion. The hub identification portion identifies a hub that contains the initiating agent. The pipe identification portion further identifies the initiating agent within the identified hub if the transaction has no ordering requirements with respect to a second agent in the identified hub.

15 Claims, 7 Drawing Sheets

| 31 30 29 28 | 27 26 25 24 23 22 21 20 | 19 18 | 17 16 15 14 | 13 12 | 11 10 9 8 | 7 6 5 4 3 2 1 0 |
|---|---|---|---|---|---|---|
| rq r/    lk cp w | Transaction Desc. Routing Field | Res. | T.D. Attr. | Res. | Data Length | Completion Status |

FIG. 6

| Encoding | Status |
|---|---|
| 0000 0000 | Successful Completion |
| 10000 0001 | Master Abort |
| 1000 0011 | Unimplemented Hub Link Special Cycle |
| 1000 0101 | Target Abort |

FIG. 7

| | | | | | |
|---|---|---|---|---|---|
| 5 | 4 | 3 | 2 | 1 | 0 |
| Hub ID | | | Pipe ID | | |

FIG. 8

| Attribute Field Value | Attribute Description |
|---|---|
| 0 | Default |
| 1 | Isochronous |
| 2 | Reserved |
| 3 | Reserved |
| 4 | Reserved |
| 5 | Reserved |
| 6 | Reserved |
| 7 | Reserved |

```
┌─────────────────────────────────────────────────────────┐
│ Outputting a transaction descriptor routing field to identify an │
│ initiating agent that initiated the transaction, the transaction │
│ descriptor routing field including a hub identification portion │
│ and a pipe identification portion, the hub identification portion │
│ to identify a hub that contains the initiating agent, the pipe  │
│ identification portion to further identify the initiating agent │
│ within the identified hub if the transaction has no ordering    │
│ requirements with respect to a second agent in the identified   │
│ hub                                                             │
│                         1110                                    │
└─────────────────────────────────────────────────────────┘
                            │
                            ▼
┌─────────────────────────────────────────────────────────┐
│       Outputting a transaction descriptor attribute field       │
│                         1120                                    │
└─────────────────────────────────────────────────────────┘
```

FIG. 11

METHOD AND APPARATUS FOR COMMUNICATING ROUTING AND ATTRIBUTE INFORMATION FOR A TRANSACTION BETWEEN HUBS IN A COMPUTER SYSTEM

FIELD OF THE INVENTION

The present invention pertains to the field of computer systems. More particularly, this invention pertains to the field of communicating between devices in a computer system.

BACKGROUND OF THE INVENTION

Prior computer systems typically rely on standardized busses, such as the Peripheral Component Interconnect (PCI) bus, to allow computer system chipset components to communicate one with another. For example, a transaction originating at a processor and intended for a disk drive might first be delivered to a first chipset component that serves as an intermediary between the processor bus and a PCI bus. The first chipset component would then deliver the transaction over the PCI bus to a second system chipset component which would then deliver the transaction to the disk drive.

Busses such as the PCI bus also provide for communication with other computer system devices such as graphics controllers and network adapters. Because busses such as the PCI bus must interface with a variety of component types, each with varying requirements, they are not necessarily optimized for allowing communication between chipset components. Further, chipset manufacturers who rely on standardized busses such as the PCI bus must adhere to bus standards in order to ensure compatibility with other components, and are not at liberty to make substantial changes in how the chipset components communicate with each other. Another issue that faces chipset component manufacturers in designing and manufacturing chipset components is the need to conform to standardized supply and signaling voltages when relying on busses such as PCI for communication between chipset components, thereby locking the manufacturers into certain design practices and manufacturing technologies.

Prior computer systems that rely on standardized busses such as PCI for communication between chipset components also typically have no mechanism for communicating that a particular transaction is isochronous and should be handled in a manner that will ensure an adequate level of quality of service.

SUMMARY OF THE INVENTION

A method and apparatus for communicating routing and attribute information for a transaction between hubs in a computer system is disclosed. The apparatus includes a data path input/output unit to output a packet header for a transaction. The packet header includes a transaction descriptor routing field to identify an initiating agent that initiated the transaction. The transaction descriptor routing field includes a hub identification portion and a pipe identification portion. The hub identification portion identifies a hub that contains the initiating agent. The pipe identification portion further identifies the initiating agent within the identified hub if the transaction has no ordering requirements with respect to a second agent in the identified hub.

BRIEF DESCRIPTION OF THE DRAWINGS

The invention is illustrated by way of example and not limitation in the figures of the accompanying drawings, in which like references indicate similar elements, and in which.

DETAILED DESCRIPTION

One embodiment of an apparatus for communicating routing and attribute information for a transaction between hubs in a computer system is disclosed. The apparatus includes a data path input/output unit to output a packet header for a transaction. The packet header includes a transaction descriptor routing field to identify an initiating agent that initiated the transaction. The transaction descriptor routing field includes a hub identification portion and a pipe identification portion. The hub identification portion identifies a hub that contains the initiating agent. The pipe identification portion further identifies the initiating agent within the identified hub if the transaction has no ordering requirements with respect to a second agent in the identified hub. The embodiment has an intended advantage of providing a mechanism for efficiently communicating information that identifies an agent that initiated a transfer to a receiving hub. An additional intended advantage of the embodiment is to provide information required to route completion packets back to the initiator, thereby minimizing packet decoding logic.

Figure 1:
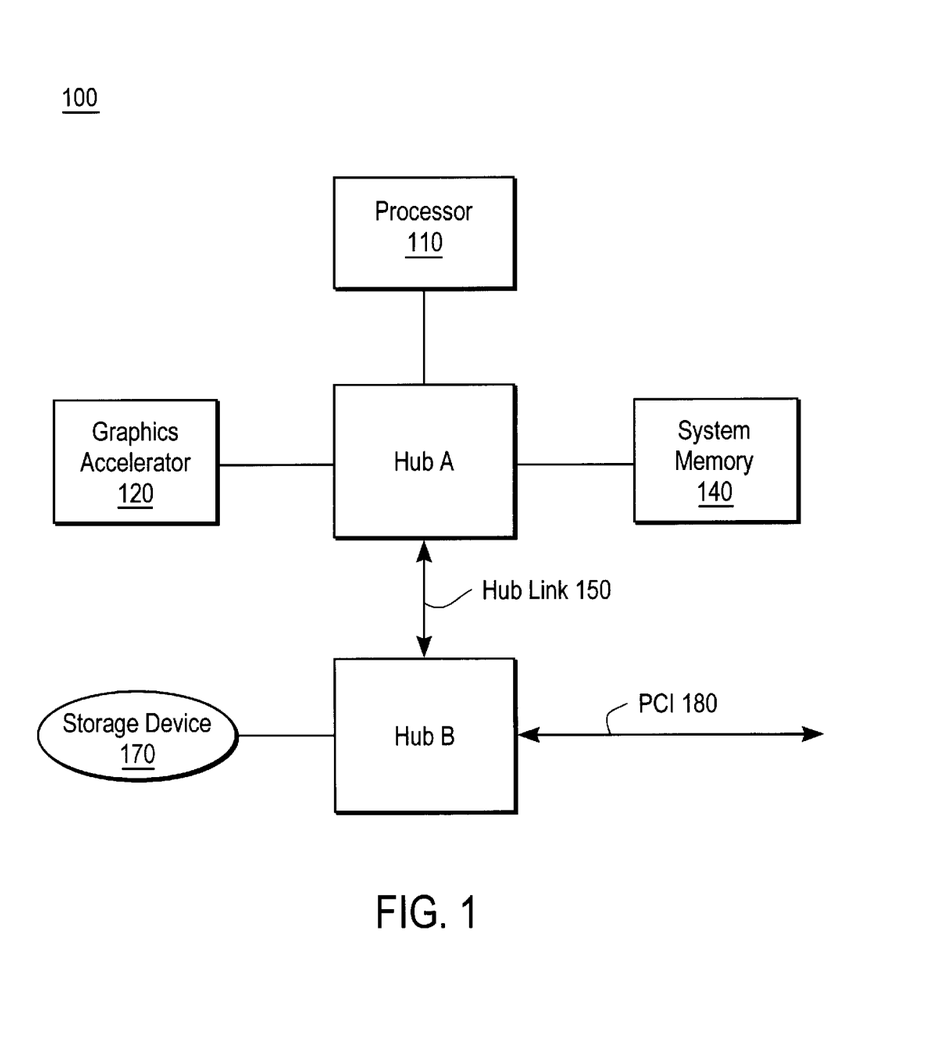
FIG. 1 shows one embodiment of a computer system including a hub link.

FIG. 1 shows one embodiment of a computer system 100 including a hub link 150. The system 100 includes a processor 110 coupled to a hub A. The hub A may include a memory controller, and is coupled to a system memory 140. The hub A is also coupled to a graphics accelerator 120. The graphics controller 120 is preferably coupled to the hub A via an accelerated graphics port (AGP). The hub A is coupled to a hub B via a hub link 150. The hub B preferably provides an interface to a storage device 170. The storage device 170 is preferably a hard disk drive. The hub B also preferably provides an interface to a PCI bus 180.

Figure 2:
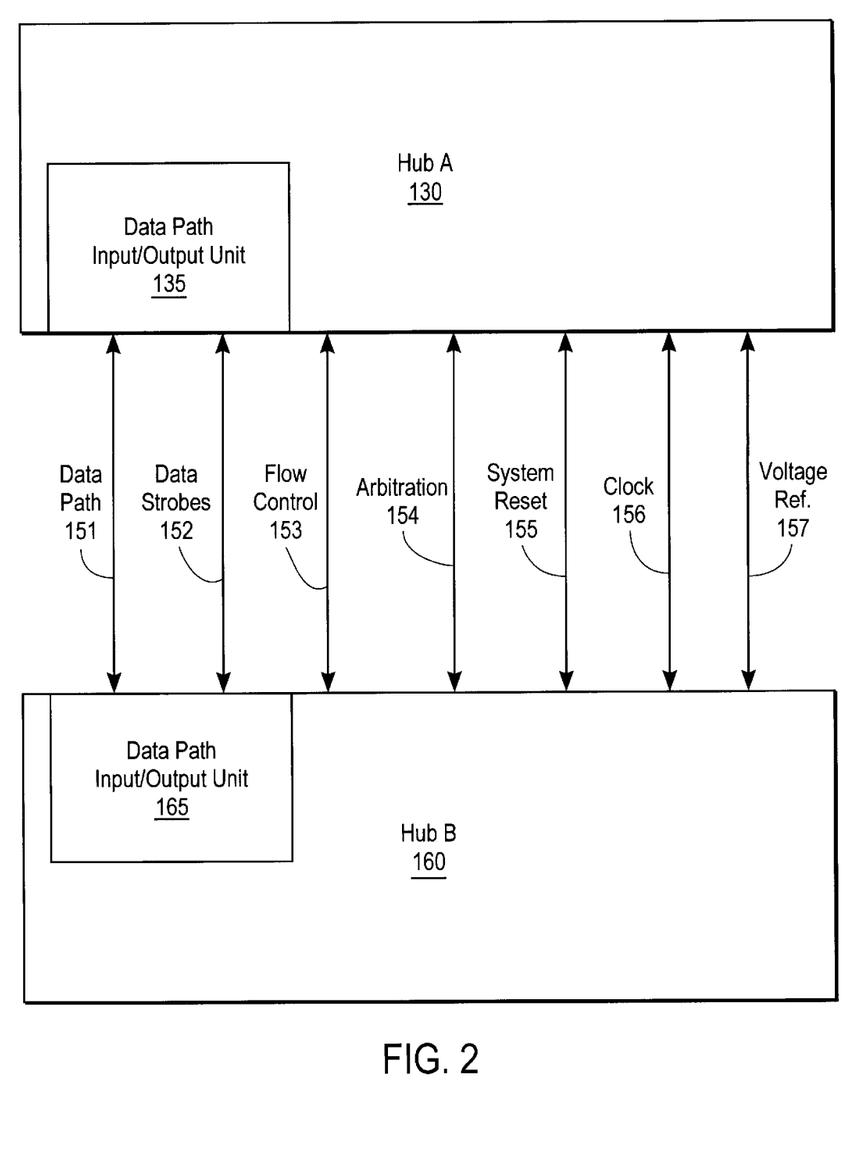
FIG. 2 is a block diagram of one embodiment of two hubs connected by a hub link including a data path.

FIG. 2 is a block diagram of one embodiment of the hub link 150 coupling the hub A and the hub B. The hub link 150 includes a bi-directional data path 151, one or more data strobes 152, a flow control signal 153, a group of arbitration signals 154, a system reset signal 155, a clock signal 156, and a voltage reference signal 157. The data path is preferably 8 bits wide, although the data path width may be any width that is a power of 2 and greater than or equal to 8 bits.

Hub A includes a data path input/output unit 135 and hub B includes a data path input/output unit 165. Both data path input/output units 135 and 165 interface to the data path 151.

In general, the hub link 150 is a mechanism for connecting main building blocks of the core logic of a computer system, such as the system 100, via a relatively narrow (8 bits in the present embodiment) and relatively high bandwidth data path 151. Between individual components in a computer system, such as between hub A and hub B, the connection is implemented in a point-to-point fashion. Transfers of information across the hub link 150 are accomplished using a packet based protocol. A request packet is generally used to start a transaction and a completion packet is used to terminate the transaction. The hub link protocol also provides a transaction description mechanism to provide deterministic quality of service. This mechanism, discussed below, provides information used for routing of hub link traffic as well as identifying the attributes of a transaction, for example by defining the transaction as isochronous or asynchronous.

Figure 3:
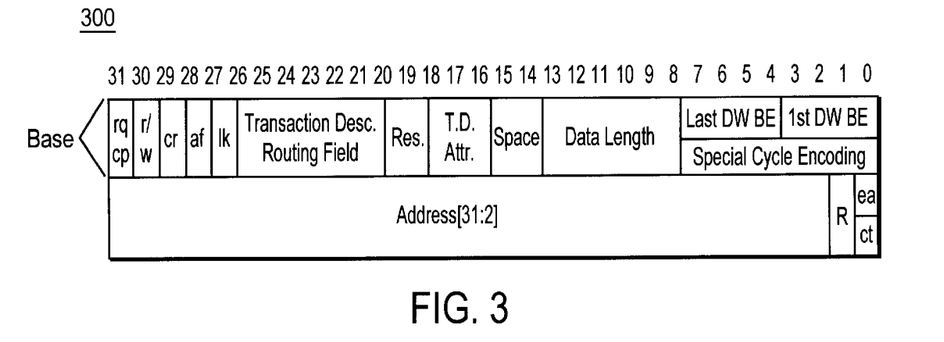
FIG. 3 is a diagram of one embodiment of a request packet header including a 32 bit addressing mode.

FIG. 3 is a diagram of one embodiment of a request packet header format including a 32 bit addressing mode. The base portion of the packet header format 300 is one doubleword in length (one word equals 16 bits). An additional doubleword is required for 32 bit addressing mode, as shown in FIG. 3. Preferably, the least significant byte (bits 0 through 7) is transferred across the data path 151 first. The various fields of the packet header 300 are described as follows. In the following descriptions of the various packet fields, specific bits settings or encodings are discussed. These represent preferred encoding schemes. Other encoding schemes are possible.

The request/completion field (rq/cp) at bit 31 of the first doubleword indicates whether a packet is a request packet or a completion packet. Preferably, a "0" indicates a request packet and a "1" indicates a completion packet. Because the packer header 300 is a request packet header, this field should be set to "0".

The read/write field (r/w) at bit 30 of the first doubleword indicates whether a packet is a read or a write transaction. The read/write field also indicates, along with the request/completion field, whether data will be included in the packet. For example, if the packet is a request and if a write is indicated, data will be included in the packet. Further, if the packet is a completion packet and if a read is indicated, data will be included in the packet. An indication of a request packet and an indication of a read signifies that no data will be included in the packet. Likewise, an indication of a completion packet and a write signifies that no data will be included in the packet Preferably, a read transaction is indicated by a "0", and a write transaction is indicated by a "1".

The completion required field (cr) at bit 29 of the first doubleword of the request packet 300 indicates whether the initiator of the packet requires a response to the request packet. Preferably, a completion required is indicated by a "1" and a no completion required is indicated by a "0". A write request packet header with the completion required bit set is issued when the initiator of the packet requires positive confirmation that the request has completed. The completion for the write should preferably not be returned until the write has reached its final destination. Memory, I/O, and configuration read requests preferably should always set the completion required bit. The completion required bit preferably should be respected by the target for all requests, including special cycles.

The address format (af) field located at bit 28 of the first doubleword indicates whether the addressing format is either implied or express (32 or 64 bit addressing). For the embodiment shown in FIG. 3, the af bit would be set to "1" to indicate express addressing. For implied addressing, the af bit should be set to "0".

The lock (lk) field located at bit 27 of the first double word indicates whether or not the current packet is part of a locked sequence. All requests and completions in a locked sequence should have this bit set to "1". Agents that do not comprehend lock should ignore this field and should always fill this field with a "0".

The transaction descriptor routing field located at bits 27 through 21 of the first double word will be discussed below in connection with FIG. 8.

Bits 20 and 19 are reserved for this embodiment.

The transaction descriptor attribute field (T.D. Attr.) located at bits 18 through 16 of the first doubleword will be discussed below in connection with FIG. 9.

The space field located at bits 15 and 14 of the first doubleword indicate whether the packet has as a destination memory space ("00"), I/O space ("01"), configuration space ("10"), or special cycles ("11").

The data length field located at bits 13 through 8 indicate the length of data (if any) to follow the packet. The data length is preferably given in doublewords, encoded such that the number of doublewords represented is one plus this number. Thus, "000000" represents one doubleword.

The last doubleword byte enable field (Last DW BE) located at bits 7 through 4 of the first doubleword indicates the byte enables for the last doubleword of data of any read or write request. The byte enables are active low ("0"). If there is only one doubleword of data for a request, this field must be inactive ("1111"). The byte enables may be discontiguous (e.g., "0101"). Byte enables are not meaningful for special cycles, and therefore the Last DW BE field overlaps the special cycle encoding field.

The first doubleword byte enable field (1$^{st}$ DW BE) located at bits 3 through 0 of the first doubleword indicates the byte enables for the first doubleword of data of any read or write request to memory, I/O, or configuration spaces. The byte enables are active low ("0"). If there is only one doubleword of data for a request, this field preferably should be used. The byte enables may be discontiguous (e.g., "0101"). Byte enables are not meaningful for special cycles, and therefore the Last DW BE field overlaps the special cycle encoding field.

The special cycle encoding field located at bits 7 through 0 of the first doubleword encodes a special cycle type. This field overlaps the first and last doubleword byte enable fields.

The address[31:2] field located at bits 31 through 2 of the second doubleword indicates the entire address for 32 bit express addressing mode and provides the lower portion of an address for 64 bit express addressing mode.

The extended address field (ea) located at bit 0 of the second doubleword indicates 32 bit addressing ("0") or 64 bit addressing ("1"). This field is valid only for memory or special cycle requests only. This field is overlapped with the configuration type (ct) field.

The ct field located at bit 0 of the second doubleword is valid for configuration cycles only. This field indicates a type "0" configuration cycle if set to "0" and indicates a type "1" configuration cycle if set to "1". These configuration cycle types preferably correspond to PCI configuration cycle types.

Figure 4:
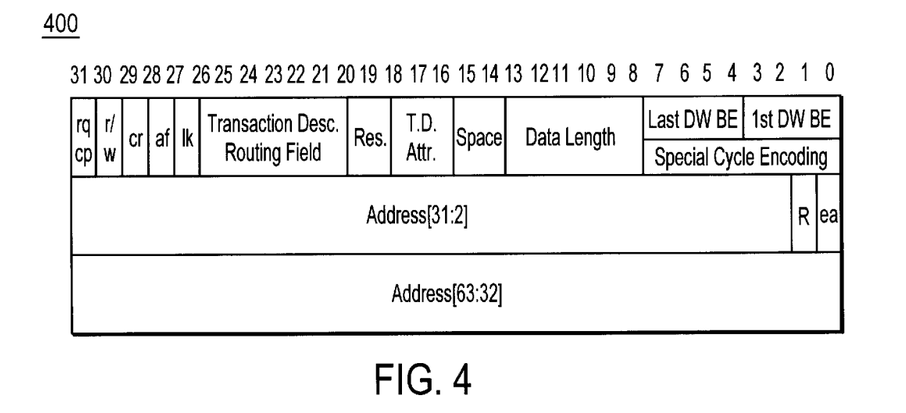
FIG. 4 is a diagram of one embodiment of a request packet header including a 64 bit addressing mode.

FIG. 4 is a diagram of one embodiment of a request packet header 400 including a 64 bit addressing mode. The fields for packet header 400 are identical to the fields shown in FIG. 3 with the addition of an address[63:32] field. The address[63:42] field contains the upper address bits for 64 bit addressing mode. For this mode the ea field is be set to "1". The address [63:32] field is included only for 64 bit addressing mode.

Figure 5:
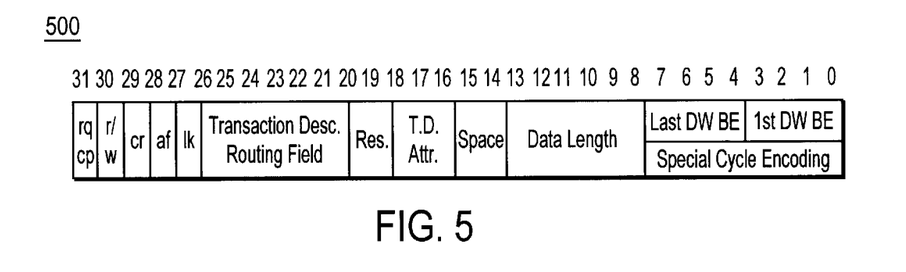
FIG. 5 is a diagram of one embodiment of a request packet header including an implied addressing mode.

FIG. 5 is a diagram of one embodiment of a request packet header 500 including an implied addressing mode. The fields for packet header 500 are identical to the fields shown in FIG. 3 with the exception of the absence of the second doubleword. The implied addressing mode is preferably applied to special cycles which do not include an address. The implied addressing mode may also be used for situations where the address can be discerned by context. When the implied mode is used, no address is sent with the request packet. The af field is set to "0" for implied addressing mode.

Figure 6:
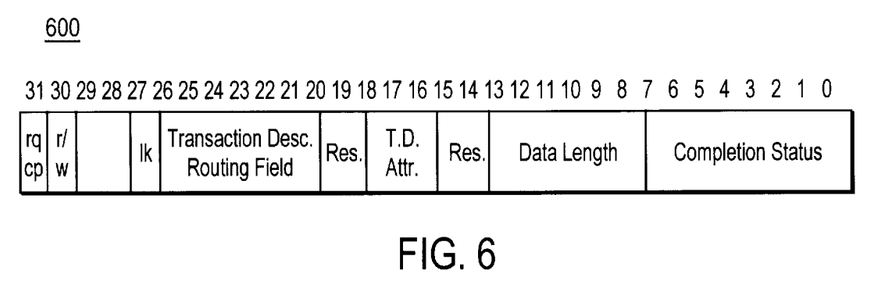
FIG. 6 is a diagram of one embodiment of a completion packet header.

FIG. 6 is a diagram of one embodiment of a completion packet header 600. The various fields are identical to those shown in connection with FIG. 5, with the exception of the absence of the completion required field, the address format field, and the space field. The byte enable fields and the special cycle field are replaced with a completion status field. The completion status field is preferably loaded with a value from the completion status encoding table shown in FIG. 7.

Completions for memory reads may provide less than the full amount of data requested so long as the entire request is eventually completed. Likewise, completions for memory writes may indicate that less than the entire request has been completed. This might be done to satisfy hub link interface latency requirements for a particular platform or to allow tradeoffs with respect to return data buffer size. If a memory read or write request has multiple completions, the completions may have different status. This may occur, for example, when an access crosses a device decoding boundary. Memory read completions preferably should contain at least one doubleword of data. The total amount of data provided for all completions corresponding to a single request must equal exactly the amount of data specified in the original request For packets returning the "master abort" status, all data requested preferably should return all "1"s.

Figure 7:
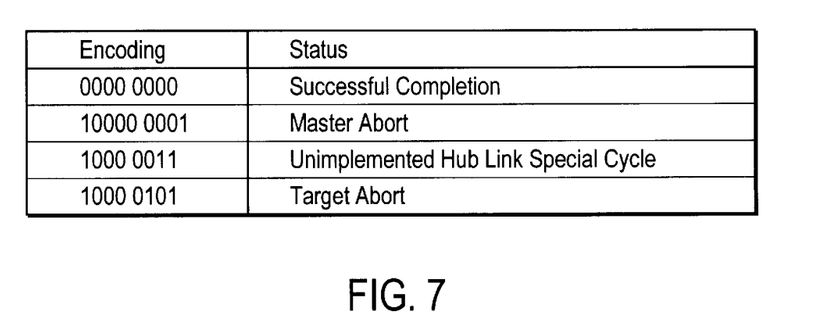
FIG. 7 shows a table of one embodiment of a completion status encoding scheme.

FIG. 7 shows a table of one embodiment of a completion status encoding scheme. For cycles targeting a device on a PCI bus, such as the PCI bus 180 shown in FIG. 1, the completion status should represent the actual termination for the cycle, except for special cycles, which preferably should report a "successful completion" status. For hub link native devices, completion status is preferably determined by the type of completion which would occur for the cycle if the device were implemented on a PCI bus. For example, if a hub link agent receives a request not targeting it, the completion status must be "master abort." This corresponds to how the cycle would have terminated on PCI. Likewise, the "target abort" completion status indicates that the targeted device was able to decode the cycle but is permanently unable to respond, and must only be used by an agent with a severe internal problem.

The implication of a "successful completion" status for a completion is that the request (or the portion indicated in the data length) was completed successfully at the final destination. Thus, a bridge will not return a completion packet for a request when it passes the request through to another interface, but must wait for a completion packet to arrive on the other interface which it will then return to the originating interface.

For a request which requires completion, it is preferable for the initiator to retain information about the request. Typically this information will include the size of the packet, lock status, routing information, etc. Some of this information will be implicit for some initiators. When receiving the completion(s), the initiator may use the information to match the completion with the corresponding request. When a request has multiple completions, it is preferable for the initiator to accumulate a count of the data completed for the original request until the original request is completed.

Figure 8:
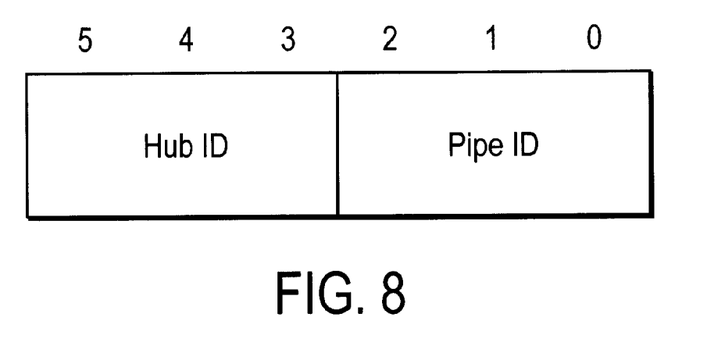
FIG. 8 is a diagram of one embodiment of a transaction descriptor routing field portion of a packet header.

FIG. 8 is a diagram of one embodiment of a transaction descriptor routing field portion of a packet header. The routing field for this embodiment is a six bit field used for packet routing. Other field widths are possible. Three bits are used for the Hub ID which identifies the agent containing the initiating master for a transaction. For this embodiment, the total number of hub link components within a particular hub link hierarchy is limited to 8. There may exist multiple hub link hierarchies in a system, in which case the agent at the top of the hierarchies must be capable of routing completions back to the correct hierarchy. The term "hierarchy" as used herein is defined as a number of hierarchically connected hub link segments starting from a hub link "root" agent which is typically a memory control hub. The remaining three bits of the routing field are used to identify internal "pipes" within a hub link agent. For example, an I/O control hub component may support internal Universal Serial Bus (USB) host controller traffic and bus master IDE (BM-IDE) controller traffic via separate "pipes" and use this mechanism to communicate to the servicing agent (in this example a memory control hub) that traffic initiated by different "pipes" does not have an ordering requirement. If a hub link agent does not implement separate internal pipes, it preferably should use a default value of "000" for the Pipe ID.

As mentioned above, the routing field is divided into two 3 bit sub-fields, the Hub ID sub-field and the Pipe ID sub-field. The Hub ID sub-field is used to support routing in a multiple hub link system (i.e. in the system that comprises of more than 2 hub link agents). Transactions coming from different hub link agents (and hence, with different Hub IDs) preferably should have no ordering requirements with respect to each other. Use of Hub ID is optional for the hub link-based systems that do not support more than two hub link components and for particular hub link components that are not designed as a hub link building blocks that can be used in larger configurations. Components that do not use Hub ID info must drive all "0"s as initiators of packets and ignore this field as targets (i.e. assume all "0" in this bit filed).

The Pipe ID sub-field may be used to differentiate transactions only if the transactions have no ordering requirements with respect to each other. In other words, they are sourced from different internal pipes that carry un-ordered traffic. Otherwise, a default value of all "0"s must be used for this field. Components that do not use Pipe ID information preferably should drive all "0"s as transaction initiators and ignore this field as targets (i.e. assume all "0" in this field).

Figure 9:
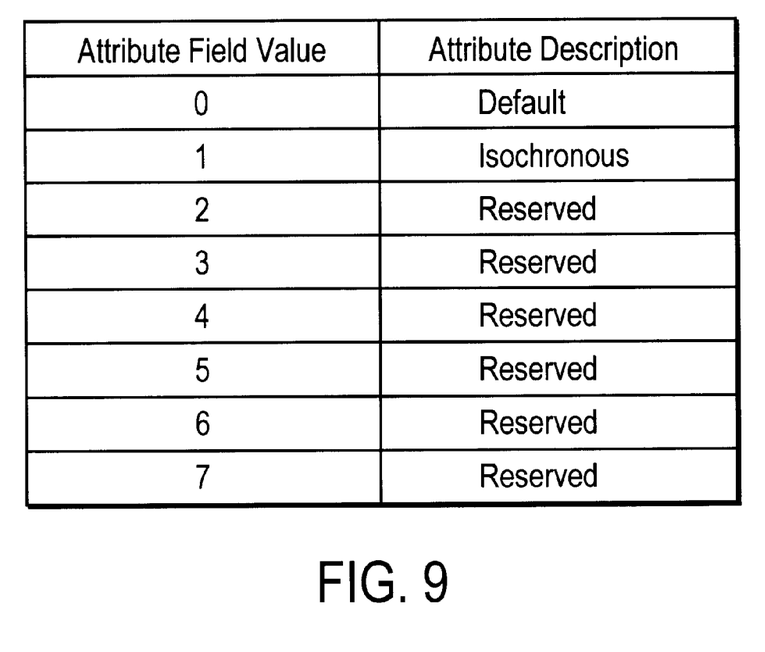
FIG. 9 shows a table of one embodiment of a transaction descriptor attribute field encoding scheme.

FIG. 9 shows a table of one embodiment of a transaction descriptor attribute field encoding scheme. The attribute field is preferably a three bit value which specifies how a transaction is to be handled when it is received by a target hub link agent, for example whether the transaction is to be handled asynchronously or isochronously. The attribute field supports demanding application workloads which rely on the movement and processing of data with specific quality of service requirements or other differentiating characteristics. In addition, recently developed external busses such as IEEE 1394 and USB enable the isochronous movement of data between devices. These guarantees must be maintained as data flows through the computer system chipset between I/O devices and memory.

While the attribute field is sufficiently large to specify the range of traffic differentiating options available with current chipsets using a one-to-one bit encoding, it may be insufficient to directly describe the range of options which platforms may need to support in the future. Therefore, the attribute field may be used as an index into an attribute mechanism table. This indirection provides a translation between an attribute specification and the actual chipset mechanisms used to implement it.

Future attributes that may be supported by the attribute field may include the ability to differentiate between "snooped" traffic where cache coherency is enforced by hardware (i.e. chipset) and "non-snooped" traffic that relies on software mechanisms to ensure data coherency in the system. Another possible attribute may be an "explicitly prefetchable" attribute to support a form of read-caching and to allow for more efficient use of the main memory bandwidth.

One important aspect of the transaction description routing and attribute fields in request and completion packets is the mechanism for carrying attributes of transactions from origination point to the point of service and back. This is important for providing an overall solution for deterministic quality of service.

Figure 10:
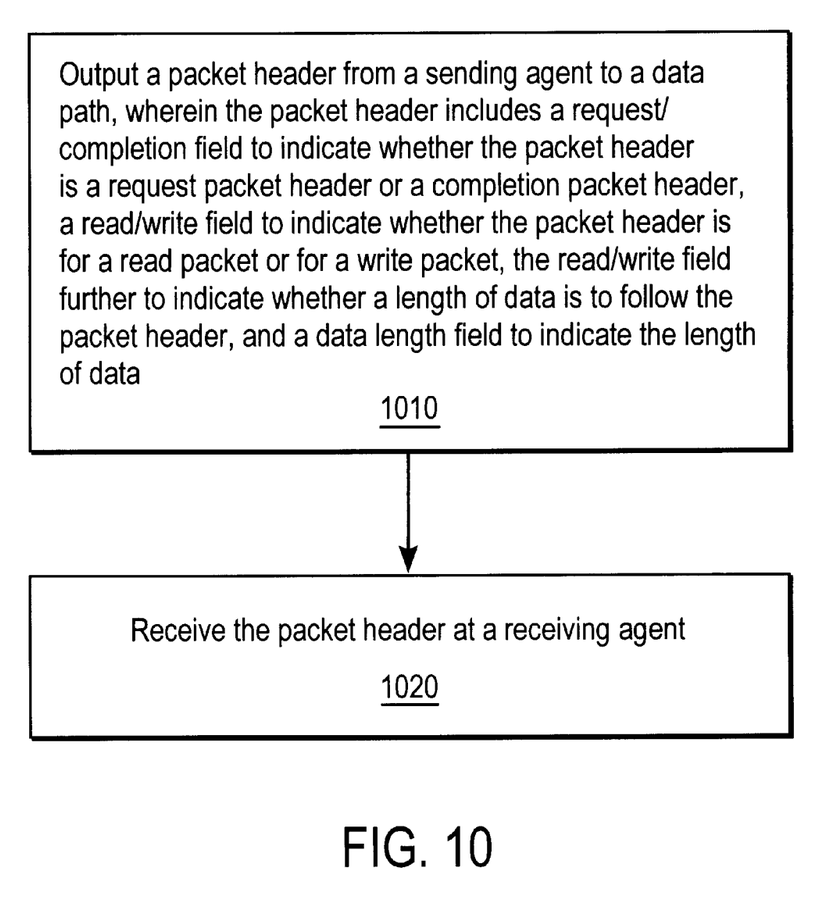
FIG. 10 is a flow chart of one embodiment of a method for communicating transaction types between hubs in a computer system.

FIG. 10 is a flow chart of one embodiment of a method for communicating transaction types between hubs in a computer system. At step 1010, a packet header is output from a sending agent to a data path. The packet header includes a request/completion field to indicate whether the packet header is a request packet header or a completion packet header and a read/write field to indicate whether the packet header is for a read packet or for a write packet. The read/write field further indicates whether a length of data is to follow the packet header. The packet header also includes a data length field to indicate the length of data. At step 1020 the packet header is received at a receiving agent.

Figure 11:
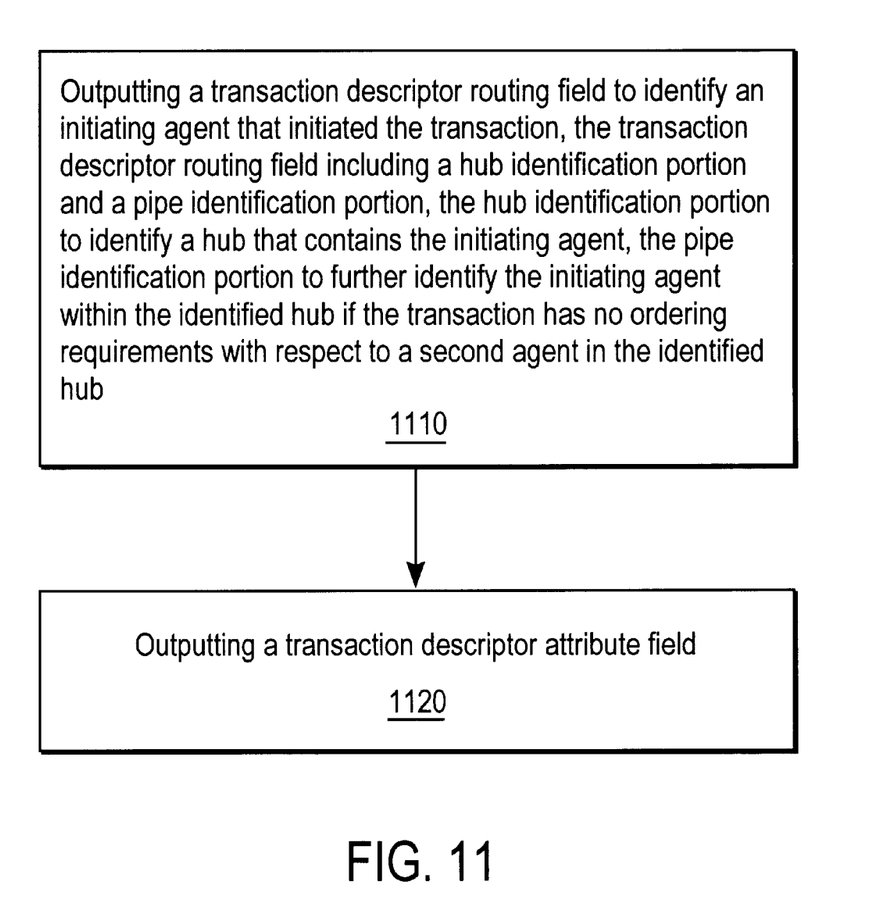
FIG. 11 is a flow chart of one embodiment of a method for communicating routing and attribute information for a transaction between hubs in a computer system.

FIG. 11 is a flow chart of one embodiment of a method for communicating routing and attribute information for a transaction between hubs in a computer system. At step 1110, a transaction descriptor routing field is output. The transaction descriptor routing field identifies an initiating agent that initiated the transaction. The transaction descriptor routing field includes a hub identification portion and a pipe identification portion. The hub identification portion identifies a hub that contains the initiating agent, and the pipe identification portion further identifies the initiating agent within the identified hub if the transaction has no ordering requirements with respect to a second agent in the identified hub. At step 1120, a transaction descriptor attribute field is output.

In the foregoing specification the invention has been described with reference to specific exemplary embodiments thereof It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
 a data path input/output unit to output a packet header for a transaction, the packet header including
  a transaction descriptor routing field to identify an initiating agent that initiated the transaction, the transaction descriptor routing field including a hub identification portion and a pipe identification portion, the hub identification portion to identify a hub that contains the initiating agent, the pipe identification portion to further identify the initiating agent within the identified hub if the transaction has no ordering requirements with respect to a second agent in the identified hub.

2. The apparatus of claim 1 wherein the packet header further includes a transaction descriptor attribute field.

3. The apparatus of claim 2, wherein the hub identification portion of the transaction descriptor routing field includes 3 bits.

4. The apparatus of claim 3, wherein the pipe identification portion of the transaction descriptor routing field includes 3 bits.

5. The apparatus of claim 4 wherein the transaction descriptor attribute field includes 3 bits.

6. The apparatus of claim 5 wherein the transaction descriptor attribute field includes an index to an attribute mechanism table.

7. An apparatus, comprising:
 a data path input/output unit to receive a packet header for a transaction, the packet header including
  a transaction descriptor routing field to identify an initiating agent that initiated the transaction, the transaction descriptor routing field including a hub identification portion and a pipe identification portion, the hub identification portion to identify a hub that contains the initiating agent, the pipe identification portion to further identify the initiating agent within the identified hub if the transaction has no ordering requirements with respect to a second agent in the identified hub.

8. The apparatus of claim 7 wherein the packet header further includes a transaction descriptor attribute field.

9. The apparatus of claim 8 wherein the transaction descriptor attribute field includes 3 bits.

10. The apparatus of claim 9 wherein the transaction descriptor attribute field indicates an isochronous transaction type.

11. The apparatus of claim 9 wherein the transaction descriptor attribute field indicates a default transaction type.

12. The apparatus of claim 9 wherein the transaction descriptor attribute field includes an index to an attribute mechanism table.

13. A system, comprising:
 a sending hub coupled to a data path; and
 a receiving hub coupled to the data path, the receiving hub including a data path input/output unit to receive a packet header for a transaction delivered by the sending hub, the packet header including
  a transaction descriptor routing field to identify an initiating agent that initiated the transaction, the transaction descriptor routing field including a hub identification portion and a pipe identification portion, the hub identification portion to identify an initiating hub that contains the initiating agent, the pipe identification portion to further identify the initiating agent within the initiating hub if the transaction has no ordering requirements with respect to a second agent in the initiating hub.

14. The system of claim 13 wherein the packet header further includes a transaction descriptor attribute field.

15. A method, comprising:

outputting a packet header from a sending hub to a data path, wherein outputting the packet header includes outputting a transaction descriptor routing field to identify an initiating agent that initiated the transaction, the transaction descriptor routing field including a hub identification portion and a pipe identification portion, the hub identification portion to identify a hub that contains the initiating agent, the pipe identification portion to further identify the initiating agent within the identified hub if the transaction has no ordering requirements with respect to a second agent in the identified hub; and outputting a transaction descriptor attribute field.

* * * * *

UNITED STATES PATENT AND TRADEMARK OFFICE
CERTIFICATE OF CORRECTION

PATENT NO. : 6,272,563 B1
DATED : August 7, 2001
INVENTOR(S) : Ajanovic et al.

It is certified that error appears in the above-identified patent and that said Letters Patent is hereby corrected as shown below:

<u>Title page,</u>
Item [54], in the Title of the Invention delete "METHOD AND APPARATUS FOR COMMUNICATING ROUTING AND ATTRIBUTE INFORMATION FOR A TRANSACTION BETWEEN HUBS IN A COMPUTER SYSTEM" and replace with -- SYSTEM FOR COMMUNICATING A SOURCE HUB ID AND A PIPE ID IF THERE IS NO ORDERING REQUIREMENTS BETWEEN DIFFERENT PIPES IN THE IDENTIFIED HUB --.

Signed and Sealed this

Nineteenth Day of March, 2002

*Attest:*

JAMES E. ROGAN
*Director of the United States Patent and Trademark Office*

*Attesting Officer*